United States Patent
Righi et al.

(10) Patent No.: US 9,495,133 B1
(45) Date of Patent: Nov. 15, 2016

(54) TEMPLATE-BASED BIOS COMPONENT CREATION

(75) Inventors: Stefano Righi, Lawrenceville, GA (US); Paul Anthony Rhea, Lawrenceville, GA (US)

(73) Assignee: American Megatrends, Inc., Norcross, GA (US)

( * ) Notice: Subject to any disclaimer, the term of this patent is extended or adjusted under 35 U.S.C. 154(b) by 1544 days.

(21) Appl. No.: 11/678,162

(22) Filed: Feb. 23, 2007

(51) Int. Cl.
*G06F 9/44* (2006.01)

(52) U.S. Cl.
CPC . *G06F 8/30* (2013.01); *G06F 8/36* (2013.01); *G06F 9/4401* (2013.01)

(58) Field of Classification Search
None
See application file for complete search history.

(56) References Cited

U.S. PATENT DOCUMENTS

| | | | | |
|---|---|---|---|---|
| 5,615,379 | A * | 3/1997 | Wehle | 717/110 |
| 5,999,730 | A * | 12/1999 | Lewis | 717/109 |
| 6,182,279 | B1 * | 1/2001 | Buxton | 717/100 |
| 6,286,104 | B1 * | 9/2001 | Buhle et al. | 726/4 |
| 6,487,713 | B1 * | 11/2002 | Cohen et al. | 717/105 |
| 6,732,296 | B1 * | 5/2004 | Cherny et al. | 714/32 |
| 7,636,722 | B2 * | 12/2009 | Bunkerr et al. | |
| 7,886,137 | B1 * | 2/2011 | Righi et al. | 713/1 |
| 2005/0044541 | A1 * | 2/2005 | Parthasarathy et al. | 717/173 |
| 2005/0229150 | A1 * | 10/2005 | Ronnewinkel | G06F 8/34 717/101 |
| 2005/0229154 | A1 * | 10/2005 | Hiew et al. | 717/110 |
| 2005/0240902 | A1 * | 10/2005 | Bunker et al. | 717/114 |
| 2005/0257204 | A1 * | 11/2005 | Bryant et al. | 717/163 |
| 2006/0123393 | A1 * | 6/2006 | Atkins et al. | 717/121 |

OTHER PUBLICATIONS

Anonymous, "Visual Studio .NET Wizards" in: Inside Visual Studio [online], MS Press, 2003 [retrieved Oct. 22, 2003], Retrieved from Internet: <http://www.microsoft.com/en-us/download/details.aspx?id=10482>, pp. 259-286.*

Wilson, K., "HOWTO: Lesson 4: Creating .RES's", thevbzone [online], 2002 [retrieved May 8, 2015], Retrieved from Internet: <URL: http://www.thevbzone.com/l_res.htm>, pp. 1-8.*

Li, P., "My Explorer in C#", Code Project [online], 2002 [retrieved Jun. 8, 2016], Retrieved from Internet: <URL: http://www.codeproject.com/Articles/2672/My-Explorer-In-C>, pp. 1-8.*

* cited by examiner

*Primary Examiner* — Todd Aguilera
(74) *Attorney, Agent, or Firm* — Lee & Hayes, PLLC

(57) ABSTRACT

Methods and computer-readable media provide for the creation of basic input/output system (BIOS) components. Embodiments include a component creation wizard that guides a user through the component creation process. The component creation wizard utilizes a project template file that includes templates of the required files for any given component, organized into a folder-based file structure. The component creation wizard searches the folders within the project template file according to project type, component categories, and template categories, as determined by a user, to locate and copy the applicable template files to create a BIOS component template.

15 Claims, 8 Drawing Sheets

TEMPLATE-BASED BIOS COMPONENT CREATION

BACKGROUND

Many computers utilize a basic input/output system (BIOS) when powering on in order to prepare the computer to recognize and control various computing devices within the computer or connected to the computer. A BIOS typically includes code embedded on a chip within the computer. This code may include various components, or independent pieces of code that provides some specific functionality within the BIOS. For example, a BIOS may include a component that provides support for a specific processor created by a specific manufacturer. Because of the virtually endless computer hardware configurations and manufacturers, a BIOS must be customized for each computer or for each varying computer configuration.

A BIOS project is a BIOS implementation that is tailored to a particular motherboard or hardware and/or software within a computer. A BIOS project includes a number of various components. The number and types of components included with any given BIOS project depend on the various computing elements within the target computer. Typically, when building a new BIOS project for a specific computer configuration, a BIOS designer must determine the required support for each computing element and sequentially provide the corresponding component code for each. The BIOS designer has to determine the proper components to include and has little flexibility to easily manipulate the components within the BIOS project once the project is built.

It is with respect to these considerations and others that the disclosure made herein is provided.

SUMMARY

Methods and computer-readable media are provided herein for creating BIOS components using BIOS template files located within a folder-based file structure. According to one implementation described herein, a method is provided for adding a component to a BIOS project. The method includes receiving a request to create a component. The request includes a component category. In response to the request, a project template file is searched for component template files associated with the component category. The project template file utilizes a folder-based file structure. A component file is created that includes a reference to at least one component template file that is associated with the component category.

According to one embodiment, the searching process of the project template file for component template files includes searching the project template file for a component category folder associated with the component category. The located component category folder is searched for all component template folders. The located component template folders are presented to a user for selection of the desired folder. After a selection of a component template folder is received, the component template folder is searched for component template files. Any located component template files are presented to a user for selection of one or more files to be included in the component being created. After the selection of at least one component template file is received, a component file that includes a reference to the selected component template files is created.

According to one aspect presented herein, a method of creating a component of a BIOS project is provided. According to the method, a user interface is displayed and at least one component category corresponding to a BIOS project is displayed via the interface. A selection of a component category is received from a user. At least one component template corresponding to the selected component category is then displayed via the user interface. After a user selects a component template from the displayed list, at least one component template file corresponding to the selection is displayed for the user to choose from. After receiving the selection of one or more component template files, a component file is created that includes any selected component template files.

According to a further implementation, a method of storing template files for creating a BIOS component is provided. The method includes creating a first folder level. The first folder level includes at least one BIOS project folder. Each BIOS project folder corresponds to a type of BIOS project. A second folder level is created that includes at least one component category folder located within each first-level BIOS project folder. A third folder level is created that includes at least one component template folder located within each second-level component category folder. At least one component template file is stored within each of the third-level component template folders.

The above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
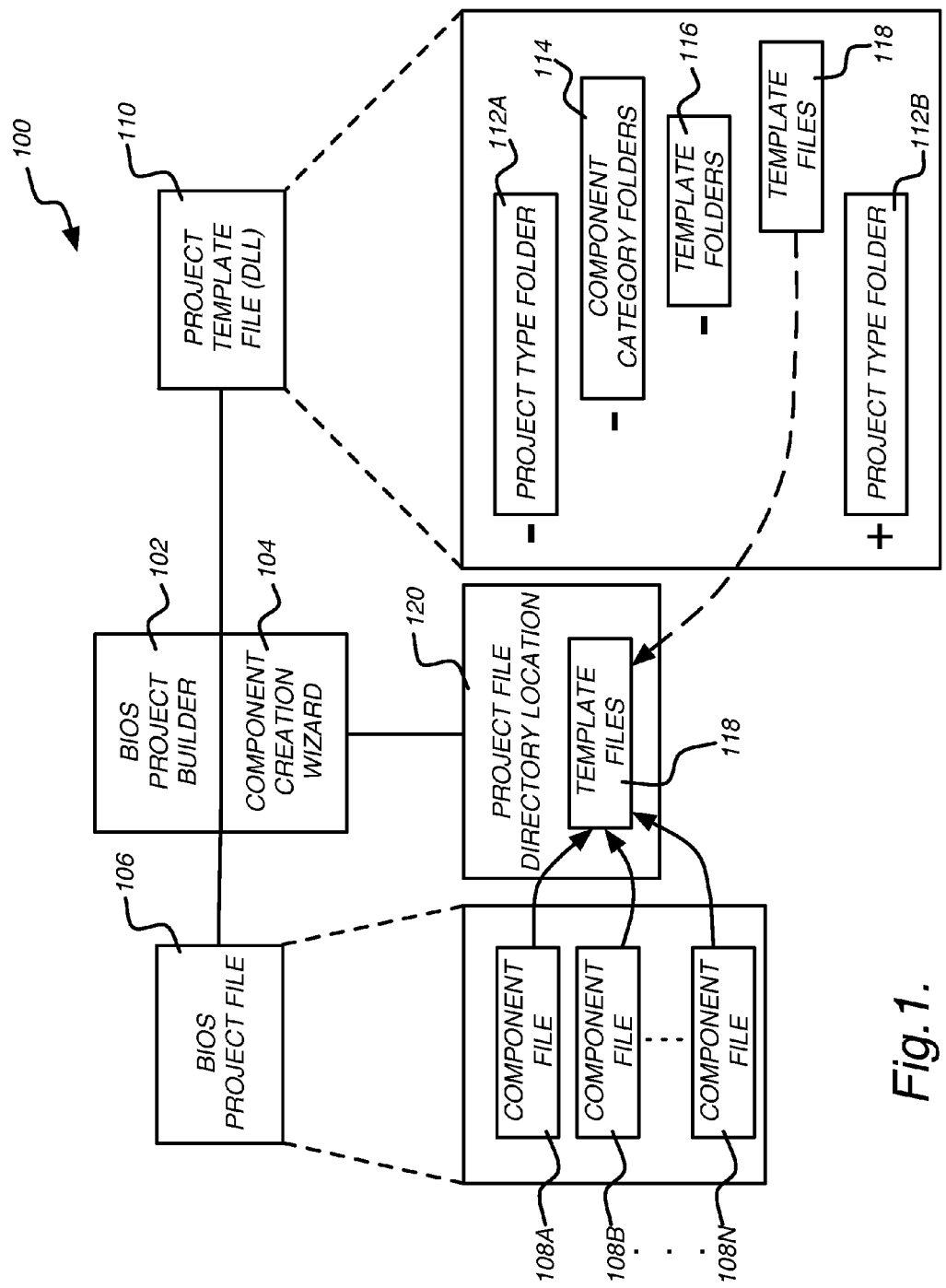
FIG. 1 is a block diagram showing an illustrative operating environment for the processes and computer systems described herein, and several of the software components utilized by the computer systems described herein.

The following detailed description is directed to systems, methods, and computer-readable media for creating BIOS components using a component creation wizard and a project template file having a folder-based file structure. While the subject matter described herein is presented in the general context of program modules that execute in conjunction with the execution of an operating system and application programs on a computer system, those skilled in the art will recognize that other implementations may be performed in combination with other types of program modules.

Generally, program modules include routines, programs, components, data structures, and other types of structures that perform particular tasks or implement particular abstract data types. Moreover, those skilled in the art will appreciate that the subject matter described herein may be practiced with other computer system configurations, including handheld devices, multiprocessor systems, microprocessor-based or programmable consumer electronics, minicomputers, mainframe computers, and the like.

The subject matter described herein may be practiced in a distributed computing environment where tasks are performed by remote processing devices that are linked through a communications network and wherein program modules may be located in both local and remote memory storage devices. It should be appreciated, however, that the implementations described herein may also be utilized in conjunction with stand-alone computer systems and other types of computing devices. It should also be appreciated that the embodiments presented herein may be utilized with any type of local area network (LAN) or wide area network (WAN).

As stated briefly above, a BIOS project is a BIOS implementation that is tailored to a particular motherboard or hardware and/or software within a computer system. A BIOS project is made up of a number of BIOS components. As used throughout this disclosure, a BIOS component is an independent module of computer code that provides some specific functionality within the BIOS project. A BIOS component may be related to one or more additional BIOS sub-components or parts. A BIOS sub-component or part is a module of computer code that is dependent upon another BIOS component or sub-component to fully realize its functionality. A sub-component may not provide its intended functionality if the component to which it has a relationship with does not exist within the BIOS project. Implementations of the disclosure provided herein provide for a method of creating BIOS components and sub-components. As used herein, a target component refers to a component that is created as a result of utilizing the methods and computer-readable media disclosed below.

According to various implementations described herein, a user is provided with a method for creating BIOS components that is flexible and user-friendly, allowing for easy manipulation of the component creation process. Embodiments include a component creation wizard that guides a user through the component creation process. The component creation wizard utilizes a project template file that includes templates of the required files for any given component, organized into a folder-based file structure that is utilized by the component creation wizard to locate and copy the applicable template files to create a BIOS component template. The nature of the file structure allows the provider of the project template file to easily manipulate and modify included project templates by moving, adding, and deleting applicable folders when new BIOS projects are developed or existing BIOS projects are modified. Utilizing the implementations provided herein, a user of the component creation wizard and project template file will be able to build a template for a BIOS component quickly and efficiently.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for providing a BIOS component using a template-based file structure system will be described. FIG. 1 shows a component creation system 100 according to one embodiment described herein. The elements of the component creation system 100 and their respective functions will be discussed briefly with respect to FIG. 1 and then in greater detail below with respect to FIGS. 2-4D. The component creation system 100 includes a BIOS project builder 102 and a component creation wizard 104. The BIOS project builder 102 may be an application that assists a user in creating a BIOS project. According to one embodiment, the BIOS project builder 102 is VISUAL EBIOS (VEB) from AMERICAN MEGATRENDS, INC. of Norcross, Ga. VEB is project management software that provides a graphical software environment to assist in firmware development.

It should be appreciated that the BIOS project builder 102 and the component creation wizard 104 may be a single application, or the component creation wizard 104 may be a separate application initiated by the BIOS project builder 102 for creation of BIOS components. The component creation wizard 104 provides a graphical user interface (GUI) to receive input from a user to define a desired BIOS component. A sample GUI will be shown and described below with respect to FIG. 3. The component creation wizard 104 utilizes a project template file 110 to search for and retrieve required files for the component being created. According to one implementation, the project template file 110 is a resource-only dynamic link library (DLL) file that contains a file structure encoded within a cabinet (CAB) file. By using a CAB file, or other compressed and encrypted or digitally signed file formats, the provider of the project template file 110 may ensure that the file structure provided to a customer is not modified by the customer in a manner that would impede future support for the product.

The files within the project template file 110 are organized according to a folder hierarchy. An example file structure will be shown and described below with respect to FIG. 2. The first level of the folder hierarchy within the project template file 110 contains project type folders 112A and 112B. The project type folders 112A and 112B each correspond to a specific type of BIOS project. For example, the project type folder 112A may correspond to an APTIO3 project and be labeled accordingly, while the project type folder 112B may correspond to an APTIO4 project and be labeled as such. Although there are two project type folders 112A and 112B shown in FIG. 1, it should be understood that there may be any number of project type folders, each corresponding to a different project type.

Within the project type folders 112A and 112B, there are component category folders 114. Components may be categorized in various ways. For example, components may be categorized according to their physical or logical existence or according to their functionality. For example, on the physical level, components may be categorized as central processing unit (CPU), chipset, flash, and input/output (IO) components. On the logical level, components may be categorized as core modules, which are generic from one BIOS project to the next, or various other modules that are related to a particular function.

According to one embodiment, the component creation wizard 104 recognizes nine potential component category folders 114, including: eCore, IO, Flash, CPU, eChipset, eModule, ModulePart, eBoard, and Flavor. The eCore category includes core binaries and source files. The IO, Flash, and CPU categories include all initialization and programming necessary to support super IO, flash, and CPU elements, respectively. The eChipset category includes code that supports chipsets such as the North Bridge and South Bridge. The eModule category adds additional functionality to the core BIOS. There may be numerous eModules providing various functionalities. Depending on the functionality, eModules may have core, chipset, and/or original equipment manufacturer (OEM) parts. Some components may include various categories of files within a single component. For example, a component may include generic files, chipset specific files, and board specific files. All of these files are included in the ModulePart category. The eBoard category includes code for supporting a particular motherboard. A Flavor component contains a list of anything that has changed for a specific project. So, the Flavor component for a given project may include files from components in every other component category. It should be appreciated that any quantity and type of component categories may be utilized within the scope of the disclosure presented herein.

Returning to the folder hierarchy within the project template file 110, the third level of folders includes template folders 116. According to one embodiment, every component category folder 114 includes a common template folder. The common template folder includes any files that are generic for that category. The template folders contain the template files 118 that will ultimately be used to create a BIOS component. The template files 118 are the initial files that constitute the component. They may include, but are not limited to, header files (H), source files (C), assembly source files (ASM), make files that describe how a component is built (MAK), dependency text source files (DSX), and proprietary files containing instructions on how to build components (SDL).

The templates of source files can contain macro definitions. As will be discussed below, if the component creation wizard 104 locates a macro definition in a source file during the creation of a component file, it will attempt to resolve the macro definition using predefined macro values, or the component creation wizard 104 may prompt the user to specify the value of the macro. The SDL files contain tokens that allow certain functionalities or the complete component to be turned on and off. For this reason, according to one implementation, each component has one SDL file. It should be appreciated that the template files 118 contain as much computer code as possible, while keeping the template files 118 "generic" with respect to a template folder 116. The template files 118 have placeholders for additional code and instructions to be added by the user once the component template has been built in order to complete the final component.

When the component creation wizard 104 has located the applicable template files 118 for inclusion within the component template, then the applicable template files 118 are copied to a project file directory location 120 specified during the file selection process as described below with respect to FIGS. 3 and 4A-4D. The component creation wizard 104 then creates a component file 108 within the BIOS project file 106 that includes references to the applicable template files 118 at the project file directory location 120. Each time a component template is created according to the implementations described herein for a BIOS project, the component creation wizard 104 creates a component file 108 within the BIOS project file 106. When complete, the BIOS project file 106 may include multiple component files 108A-108N. According to one embodiment, the component files 108A-108N are component information (CIF) files. It should be appreciated that the CIF files 108A-108N define the relationship between the files referenced within each component according to a standard.

Figure 2:
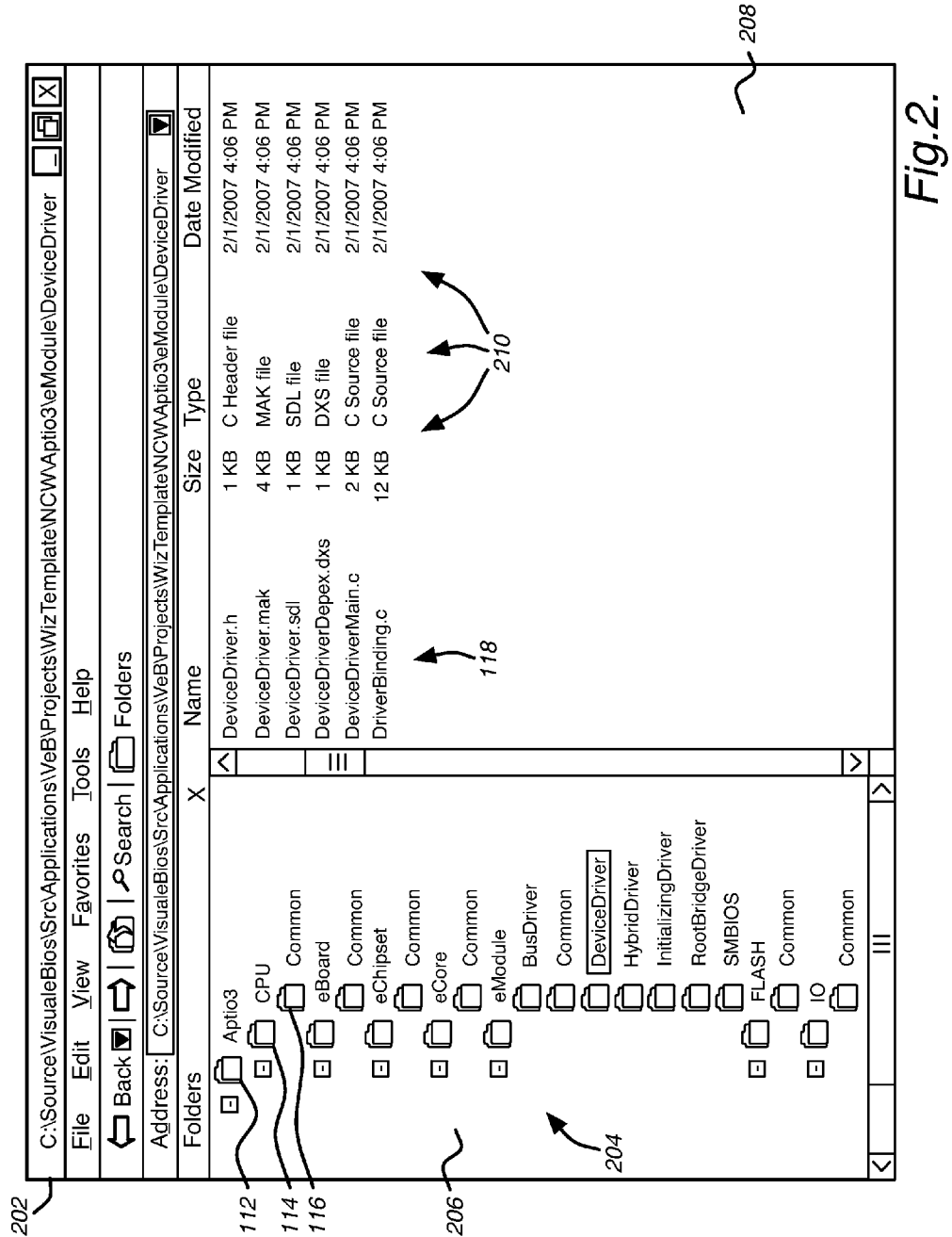
FIG. 2 is a user interface diagram showing an illustrative project template folder structure according to one embodiment presented herein.

Turning now to FIG. 2, a user interface diagram 202 shows a sample folder hierarchy 204 within the project template file 110. The user interface diagram 202 shown is an example of an interface provided by a BIOS project builder 102 such as VEB. However, it should be appreciated that the user interface diagram 202 may be an output of any application that is operative to access the project template file 110. The folder hierarchy 204 described above with respect to the project template file 110 can be seen in the folder window 206 of the user interface diagram 202. In this example, the project type folder 112 is shown to be expanded, exposing the second-level component category folders 114, which are also expanded to expose the third-level template folders 116.

According to this example, an "Aptio3" project type folder 112 includes the "CPU," "eBoard," "eChipset," "eCore," "eModule," "FLASH," and "IO" component category folders 114. Each component category folder 114 includes at least a "Common" template folder 116. The "eModule" component category folder 114 includes a number of template folders 116. The "DeviceDriver" template folder is selected, exposing the template files 118 in the file window 208. The file window 208 provides a list of all template files 118 located within the corresponding template folder 116, as well as template file information 210. The template file information 210 includes the file sizes, file types, and file modification dates. It should be appreciated that any quantity and type of template file information 210 may be displayed in the file window 208.

Figure 3:
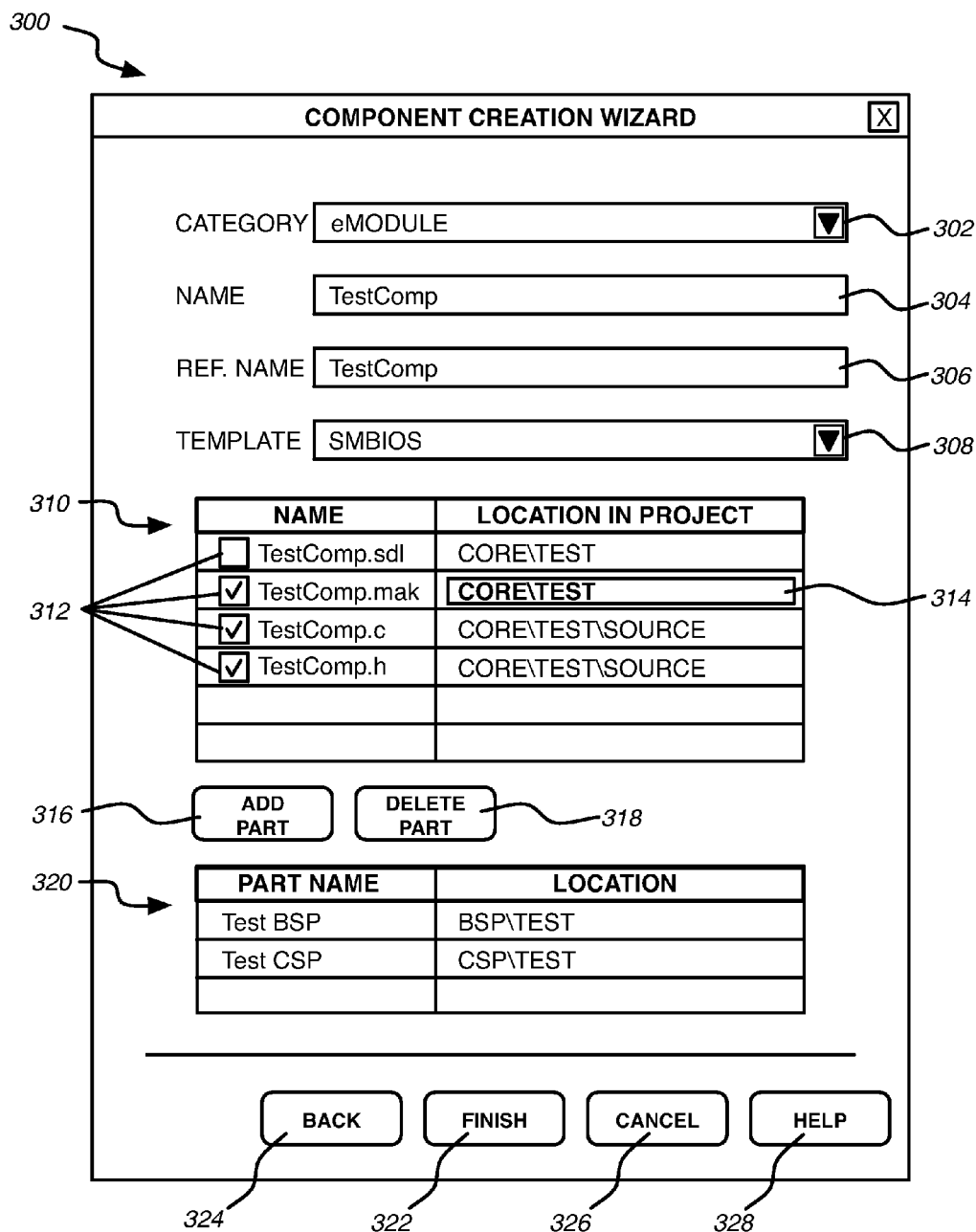
FIG. 3 is a user interface diagram showing an illustrative component creation wizard user interface according to one embodiment presented herein.
Figure 4A:
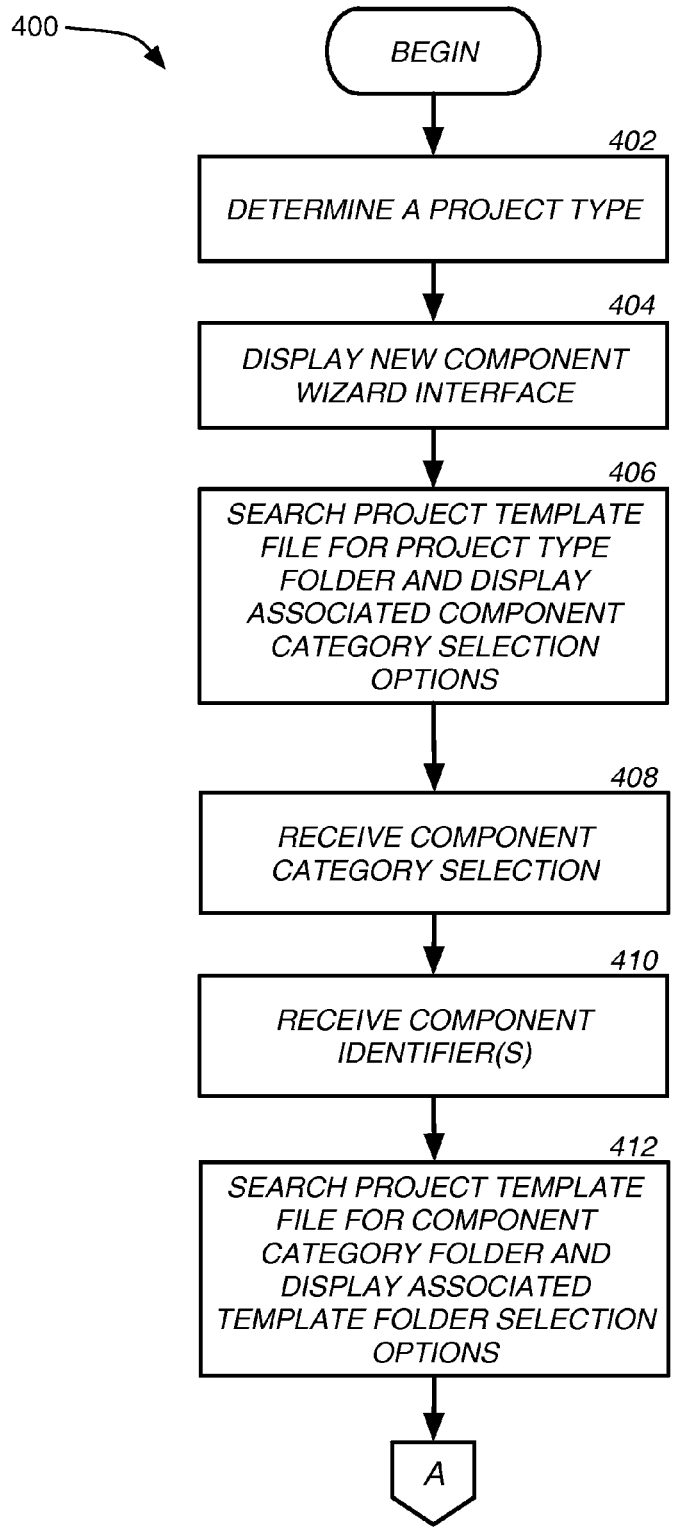
FIGS. 4A-4D are flow diagrams illustrating one method for creating a BIOS component according to one embodiment presented herein.
Figure 4B:
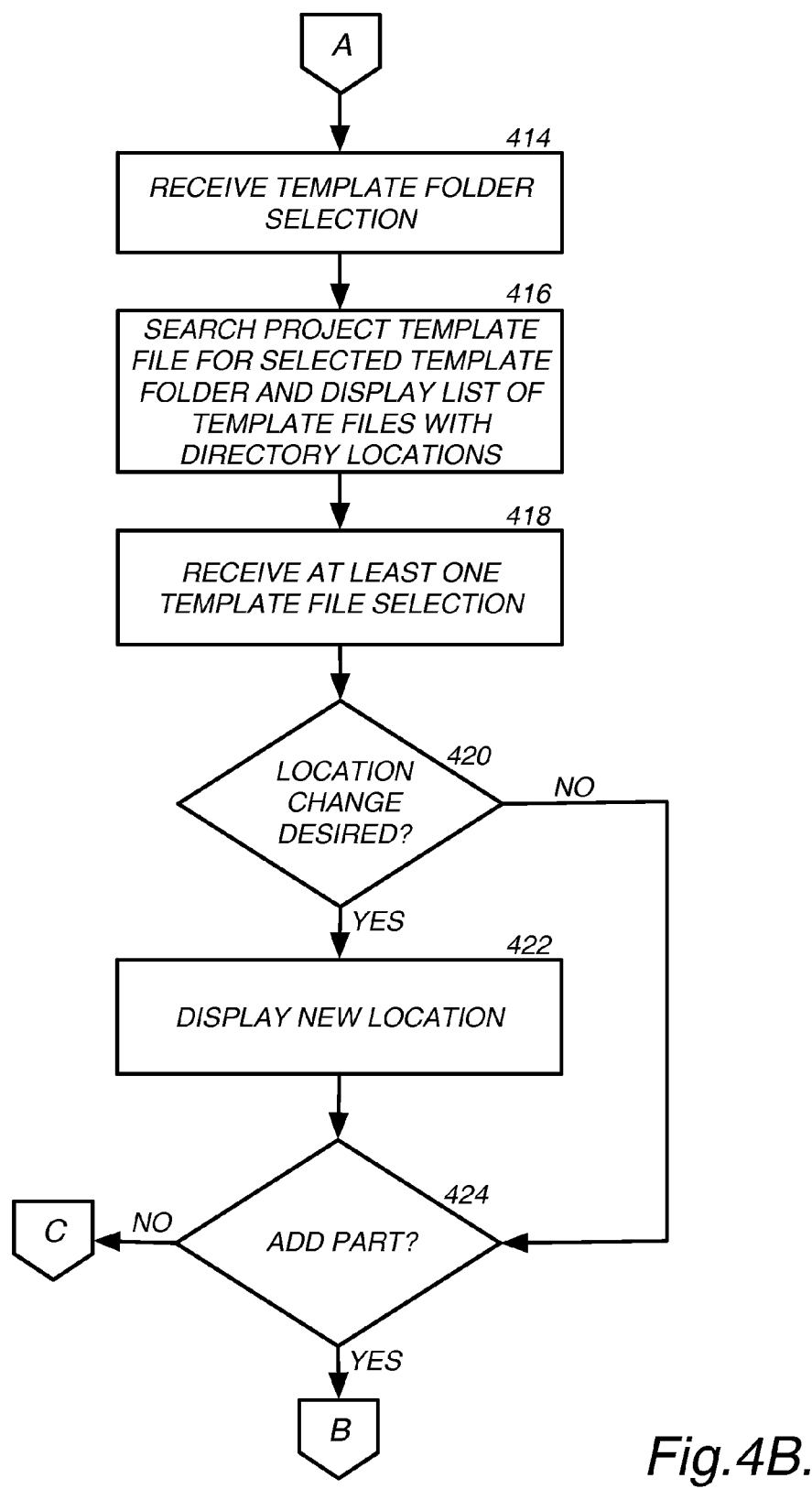
Figure 4C:
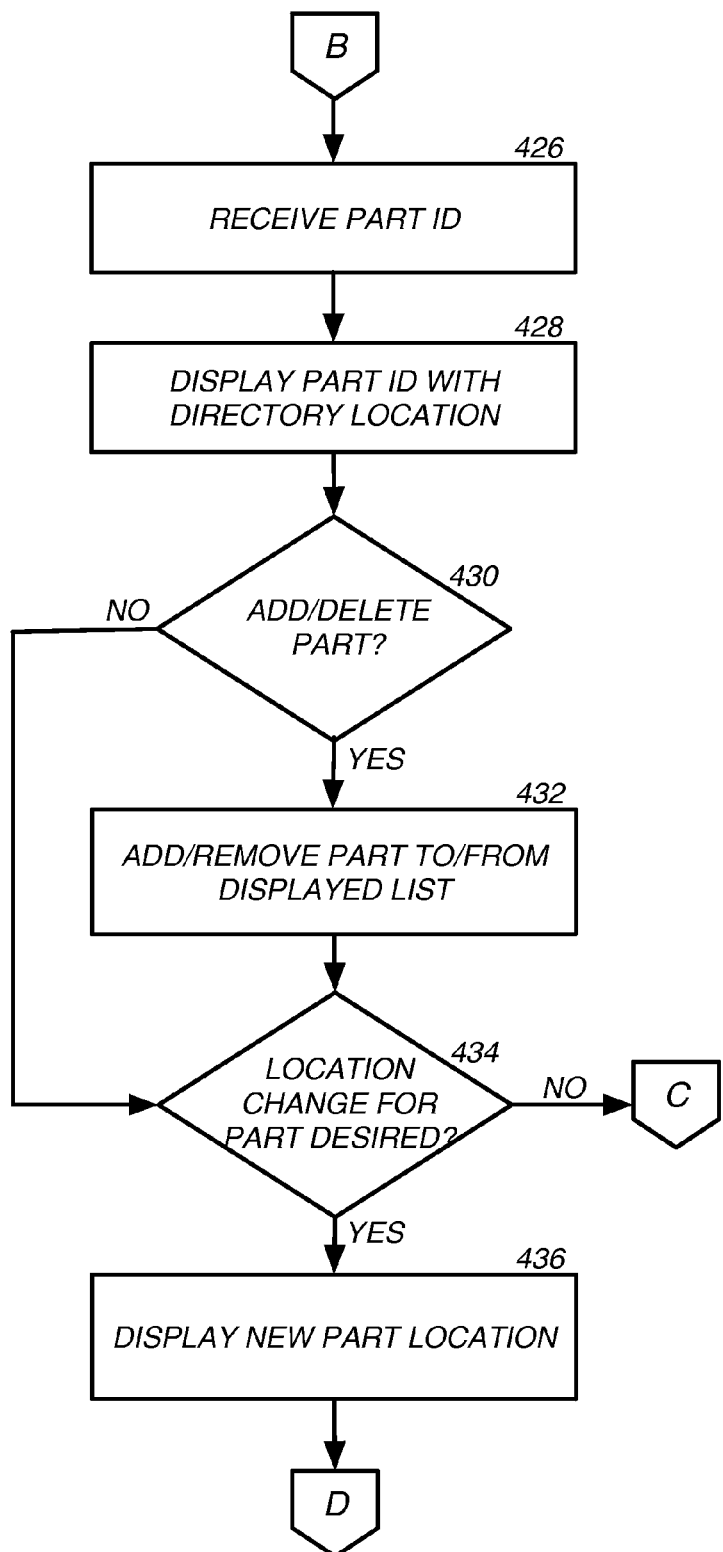
Figure 4D:
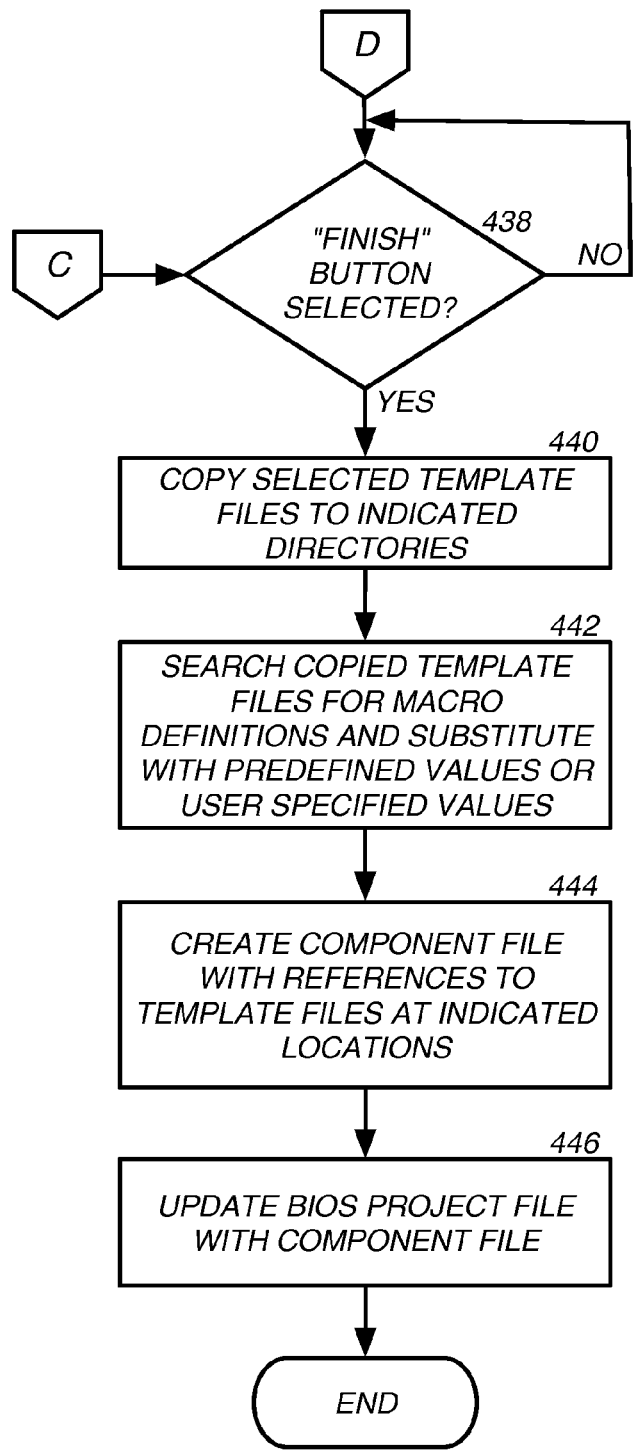

FIG. 3 shows an example of a component creation wizard user interface 300 according to one implementation of the disclosure provided herein. A user that is creating a BIOS component would enter this user interface 300 after having previously designated a project type using the BIOS project builder 102. It should be understood that the component creation wizard user interface 300 could include an input field for selecting a project type if not previously selected using the BIOS project builder 102, or if the component creation wizard 104 is used without utilizing the BIOS project builder 102.

The component creation wizard 104 searches the folder hierarchy 204 of the project template file 110 for a project type folder 112 having the same name as the project type selected by the user. Once the corresponding project type folder 112 is found, a drop-down menu within the component category field 302 is populated with the names of the component category folders 114 associated with the located project type folder 112. For example, if the user selected "Aptio3" as the project type using the BIOS project builder 102, then the component creation wizard 104 would provide "CPU," "eBoard," "eChipset," "eCore," "eModule," "FLASH," and "IO" as the component category options under the drop-down menu of the component category field 302 since those options correspond to the names of the component category folders 114 associated with the "Aptio3" project type folder 112.

Continuing the example shown in FIG. 3, after selecting "eModule" from the drop-down menu as the category for the target component being built, the user has an opportunity to input a name for the target component in the name field 304, as well as a reference name for the target component in the reference name field 306 of the component creation wizard user interface 300. According to one embodiment, the component name is a string that will be used to identify the component inside the project. It may clearly identify the component, but does not need to strictly adhere to any programming naming convention as it will not be used by the BIOS project builder 102 for searching purposes. The reference name input into the reference name field 306 is a string that should uniquely identify the component. This string will be used by the BIOS project builder 102 when searching for this component. It should be understood that the component name and the component reference name may be the same string and that any number of input fields may be used to input any number of component identifiers.

When the user has selected a component category from the drop-down menu of the component category field 302, the component creation wizard 104 searches the folder hierarchy 204 of the project template file 110 for a component category folder 114 having the same name as the component category selected by the user. Once the corresponding component category folder 114 is found, a drop-down menu within the template folders field 308 is populated with the names of the template folders 116 associated with the located component category folder 114. The user selects the appropriate template folder 116 for the target component and the component creation wizard 104 locates the corresponding template folder 116 in the project template file 110.

The component creation wizard 104 populates the template file list 310 with the names of all template files 118 located within the selected template folder 116. According to one implementation, check boxes 312 are displayed with each template file 118 in the template file list 310. The user may then select or deselect each template file 118 to determine which template files 118 are to be included in the target component according to the desired target component configuration. The component creation wizard 104 lists a target directory location for each template file 118 to which the template file 118 will be copied if selected to be included in the target component. The user may select each directory location and edit that directory location as desired. As an example, the location field 314 is shown to be highlighted for editing by the user.

Once the user has selected the desired template files 118 to be included in the target component, then the user has an opportunity to add or delete component parts using the "Add Part" button 316 and the "Delete Part" button 318, respectively. As discussed briefly above, a component part is a sub-component. The component part is a module of computer code that depends upon the parent component and/or sibling parts for full operability. The component part may be created in the same manner as described herein for the parent component, using the component creation wizard 104 and project template file 110, prior to inclusion in a target component as a part. When a user selects the "Add Part" button 316, he or she may be prompted to browse the project template file 110 or other designated memory location for corresponding component parts to add to a component part list 320 of the component creation wizard user interface 300.

Once the user has entered the required information in the appropriate fields of the component creation wizard user interface 300, the user may complete the component creation process by selecting the "Finish" button 322. Alternatively, the user may select the "Back" button 324 to return to a previous screen or to clear the current component creation wizard user interface 300, the "Cancel" button 326 to exit the component creation wizard 104, or the "Help" button 328 to receive assistance. When the "Finish" button 322 is selected, the component creation wizard 104 reads all template files 118 for any macro definitions and substitutes them with predefined values or prompts the user to specify a value. The selected template files 118 and parts are copied into the specified directories at the project file directory location 120 and the component creation wizard 104 creates a component file 108 within the BIOS project file 106 with references to the template files 118 at the project file directory location 120.

Turning now to FIGS. 4A-4D, an illustrative routine 400 will be described for creating a BIOS component according to various embodiments presented herein. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance requirements of the computing system. Accordingly, the logical operations described herein are referred to variously as operations, structural devices, acts, or modules. These operations, structural devices, acts and modules may be implemented in software, in firmware, in special purpose digital logic, and any combination.

The routine 400 begins at operation 402, where the component creation wizard 104 determines the type of project that the user is creating the component for. As discussed above, the project type may be determined from the BIOS project builder 102 prior to presenting the user with the component creation wizard user interface 300, or the user may be prompted for the project type by the component creation wizard user interface 300. From operation 402, the routine 400 continues to operation 404, where the component creation wizard 104 displays the component creation wizard user interface 300 for accepting input from the user, if the interface is not already displayed from prompting the user for a project type.

The routine 400 continues from operation 404 to operation 406, where the component creation wizard 104 searches the project template file 110 for the project type folder 112 corresponding to the determined project type. When found, the component creation wizard 104 searches the project type folder 112 for all component category folders 114 and displays the names of the component category folders 114 as selection options. As described above with respect to FIG. 3, the component category selection options may be displayed in a drop-down menu for selection in the component category field 302. From operation 406, the routine 400 continues to operation 408, where the component creation wizard 104 receives a selection of the component category. At operation 410, the component creation wizard 104 receives one or more component identifiers. As described above, according to one implementation, the component creation wizard user interface 300 has a name field 304 and a reference name field 306 for receiving the desired component identifiers.

From operation 410, the routine 400 continues to operation 412, where the component creation wizard 104 searches the project template file 110 for the component category folder 114 corresponding to the selected component category. When found, the component creation wizard 104 searches the component category folder 114 for all template folders 116 and displays the names of the template folders 116 as selection options. As described above, the template folder selection options may be displayed in a drop-down menu for selection in the template folders field 308. From operation 412, the routine 400 continues to operation 414, where the component creation wizard 104 receives a selection of the desired template folder 116.

The routine 400 continues from operation 414 to operation 416, where the component creation wizard 104 searches the project template file 110 for the selected template folder 116. When found, the component creation wizard 104 searches the template folder 116 for all template files 118 and displays the names of the template files 118 within the template file list 310. Along with the names of the template files 118, the component creation wizard 104 displays the corresponding directory location information. From operation 416, the routine 400 continues to operation 418, where the component creation wizard 104 receives a selection of at least one desired template file 118. As previously discussed, the selection may be received via checkboxes presented to the user in the template file list 310 or via any other method for selecting one or more options within a user interface.

From operation 418, the routine 400 continues to operation 420, where the component creation wizard 104 determines whether a directory location has been changed. The user may select a user interface field containing the directory location for a template file 118 and amend the location. If this action is detected by the component creation wizard 104, then the routine 400 continues to operation 422 and the new location replaces the previous location where displayed within the component creation wizard user interface 300. The routine then continues to operation 424. If a directory location change is not detected at operation 420, then the routine proceeds directly to operation 424, where the component creation wizard 104 determines whether the user is attempting to add a component part to the target component. A determination may be made that the user is attempting to add a component part if the "Add Part" button 316 has been selected.

If a determination is made that the user is not attempting to add a component part to the target component, then the routine 400 proceeds from operation 424 to operation 438 and proceeds as described below. However, if at operation 424, a determination is made that the user would like to add a component part, then the routine 400 continues from operation 424 to operation 426, where the identity of the component part that the user is attempting to add is received. The name or other identifier of the component part to be added is displayed in the component part list 320 of the component creation wizard user interface 300 along with the corresponding directory location of the component part at operation 428. The routine continues from operation 428 to operation 430, where the component creation wizard 104 determines whether the user is attempting to add or delete a component part. This determination may be based on whether the "Add Part" button 316 or the "Delete Part" button 318 has been selected. It should be appreciated that any other method of identifying component parts for inclusion or deletion may also be used.

If at operation 430, the component creation wizard 104 determines that the user is attempting to add or delete a component part to or from the target component, then the corresponding action component part is added to or removed from the component part list 320 at operation 432 and the routine 400 continues to operation 434. However, if at operation 430, the component creation wizard 104 does not determine that the user is attempting to add or delete a component part to or from the target component, then the routine 400 proceeds directly to operation 434.

At operation 434, the component creation wizard 104 determines whether the user is attempting to change the directory location for a component part. A determination that the user is attempting to change the directory location may be based on a selection of a user interface field containing the directory location for a component part and subsequent amendment. If this action is detected by the component creation wizard 104, then the routine 400 continues to operation 436 and the new location replaces the previous location where displayed within the component creation wizard user interface 300 and the routine continues to operation 438. If a directory location change is not detected at operation 434, then the routine proceeds directly to operation 438, where the component creation wizard 104 determines whether the user has selected the "Finish" button 322, indicating the completion of the component creation wizard 104 and desire for the creation of the corresponding target component.

If the "Finish" button 322 has not been selected, then the component creation wizard 104 awaits further user input until the "Finish" button 322 is selected. However, if at operation 438, the component creation wizard 104 determines that the "Finish" button 322 has been selected, then the routine 400 continues to operation 440, where the template files 118 that were selected by the user for inclusion within the target component are copied to the appropriate directories at the designated locations. From operation 440, the routine 400 continues to operation 442, where the component creation wizard 104 searches the copied template files 118 for any macro definitions and either substitutes the macro definitions with predefined values or prompts the user for values. The routine 400 continues from operation 442 to operation 444, where the component creation wizard 104 creates a component file 108. As discussed above, the component file 108 may be a CIF file and contains references to the copied template files 118.

It should be appreciated that one of the copied template files 118 will be a SDL file having instructions as well as tokens for enabling and disabling specific component functionalities as discussed above. The routine 400 continues from operation 444 to operation 446, where the component creation wizard 104 updates the BIOS project file 106 to include the component file 108 or a reference to the component file 108. As stated above, the BIOS project file 106 may include multiple component files 108A-108N corresponding to multiple BIOS components, each created according to the implementations described above. From operation 446, the routine 400 ends.

Figure 5:
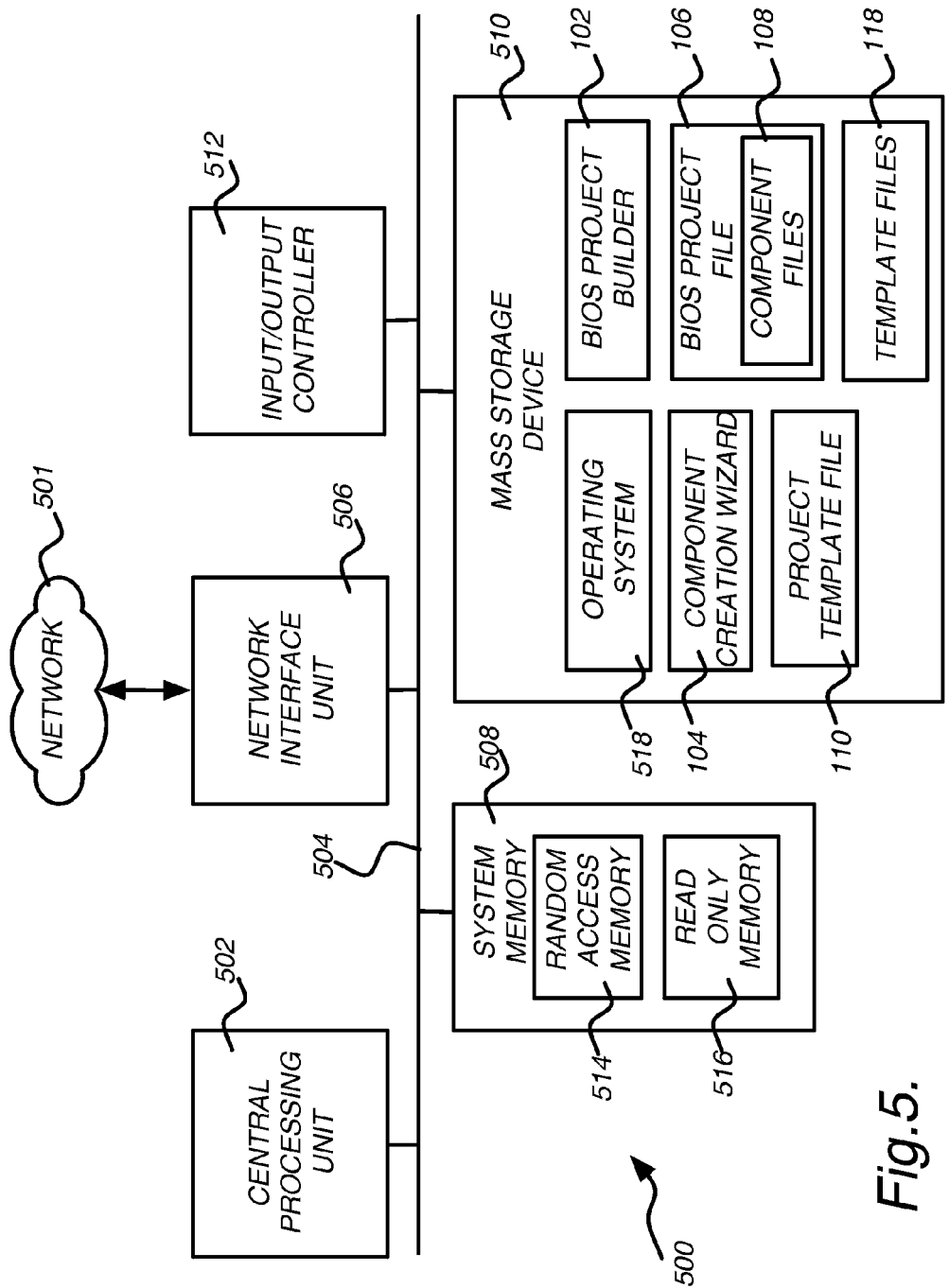
FIG. 5 is a computer architecture diagram showing a computer architecture suitable for implementing the various computer systems described herein.

Referring now to FIG. 5, an illustrative computer architecture for a computer 500 utilized in the various embodiments presented herein will be discussed. The computer architecture shown in FIG. 5 illustrates a conventional desktop, laptop computer, or server computer. The computer architecture shown in FIG. 5 includes a central processing unit 502 (CPU), a system memory 508, including a random access memory 514 (RAM) and a read-only memory (ROM) 516, and a system bus 504 that couples the memory to the CPU 502. A BIOS containing the basic routines that help to transfer information between elements within the computer 500, such as during startup, is stored in the ROM 516. The computer 500 further includes a mass storage device 510 for storing an operating system 518, application programs, and other program modules, which will be described in greater detail below.

The mass storage device 510 is connected to the CPU 502 through a mass storage controller (not shown) connected to the bus 504. The mass storage device 510 and its associated computer-readable media provide non-volatile storage for the computer 500. Although the description of computer-readable media contained herein refers to a mass storage device, such as a hard disk or CD-ROM drive, it should be appreciated by those skilled in the art that computer-readable media can be any available media that can be accessed by the computer 500.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the computer 500.

According to various embodiments, the computer 500 may operate in a networked environment using logical connections to remote computers through a network 501, such as the Internet. The computer 500 may connect to the network 501 through a network interface unit 506 connected to the bus 504. It should be appreciated that the network interface unit 506 may also be utilized to connect to other types of networks and remote computer systems. The computer 500 may also include an input/output controller 512 for receiving and processing input from a number of other devices, including a keyboard, mouse, or electronic stylus (not shown in FIG. 5). Similarly, an input/output controller may provide output to a display screen, a printer, or other type of output device (also not shown in FIG. 5).

As mentioned briefly above, a number of program modules and data files may be stored in the mass storage device 510 and RAM 514 of the computer 500, including an operating system 518 suitable for controlling the operation of a networked desktop or server computer, such as the WINDOWS XP or WINDOWS VISTA operating systems from MICROSOFT CORPORATION of Redmond, Wash. Other operating systems, such as the LINUX operating system or the OSX operating system from APPLE COMPUTER, INC. may be utilized. It should be appreciated that the implementations presented herein may be embodied using a desktop or laptop computer or any other computing devices or systems or combinations thereof.

The mass storage device 510 and RAM 514 may also store one or more program modules. In particular, the mass storage device 510 and the RAM 514 may store a BIOS project builder 102, a component creation wizard 104, a project template file 110, a BIOS project file 106, one or more component files 108A-108N, template files 118, and the other program modules described above with respect to FIG. 1. Other program modules may also be stored in the mass storage device 510 and utilized by the computer 500.

Based on the foregoing, it should be appreciated that systems, methods, and computer-readable media for creating a BIOS component using a folder-based project template file are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A non-transitory computer storage medium comprising computer-executable instructions stored thereon that, when executed by a computer, cause the computer to:
provide at least one project type folder;
present a user interface in response to receiving a selected project type folder;
provide, from the selected project type folder, at least one component category corresponding to a BIOS project via the user interface, the component category categorized according to a physical aspect of a BIOS component, a logical aspect of the BIOS component, or a functional aspect of the BIOS component, wherein the BIOS project is a BIOS implementation tailored to a particular motherboard, hardware, or software within a computer system;
receive, from a first drop-down menu in the user interface, a selected component category that corresponds to any of one or more component category folders associated with the BIOS project within a project template file, wherein the project template file comprises a resource-only dynamic link library file that contains a file structure encoded within a cabinet file;
search, in the selected component category, for component templates associated with the selected component category,
populate a second drop-down menu with the component templates;
receive, from the second drop-down menu, a selected component template;
provide, from the selected component template, at least one component template file corresponding to the selection of the component template via the user interface, wherein the at least one component template file comprises an initial file that constitutes the BIOS component and templates of at least one required file for the BIOS component;
receive a selected component template file;
copy the selected component template file to a directory, the component template file comprising instructions for building the BIOS component and a token for activating or deactivating functionality associated with the BIOS component; and
create a component file comprising a reference to the selected component template file in the directory.

2. The non-transitory computer storage medium of claim 1,
wherein the at least one component category provided via the user interface corresponds to any component category folders associated with the BIOS project within a project template file,
wherein the at least one component template provided via the user interface corresponds to any component template folders within a component category folder associated with the selected component category, and
wherein the at least one component template file provided via the user interface corresponds to any component template files stored within a component template folder associated with the selected component template.

3. The non-transitory computer storage medium of claim 1, further comprising computer-executable instructions stored thereon that, when executed by the computer, cause the computer to:
provide a selectable option via the user interface for adding a component part to the component; and
receive a request via the user interface to add the component part to the component, wherein the component file defines a relationship between the component and the component part.

4. The non-transitory computer storage medium of claim 1, wherein the instructions for building the BIOS component comprise a proprietary file containing instructions on how to build components, wherein the selected component template file is a component information file, and wherein the project template file comprises a cabinet (CAB) file.

5. A method of adding a BIOS component to a basic input/output system (BIOS) project, the method comprising:
receiving a request to create the BIOS component, the request comprising a component category categorized according to a physical aspect of the BIOS component, a logical aspect of the BIOS component, or a functional aspect of the BIOS component, wherein the BIOS project is a BIOS implementation tailored to a particular motherboard, hardware, or software;
in response to the request, searching a project template file for component template files associated with the component category, the component template files comprising templates of at least one required file for the BIOS component, wherein the project template file comprises a resource-only dynamic link library file that contains a file structure encoded within a cabinet file, wherein the project template file comprises an initial file that constitutes the BIOS component, and wherein searching the project template the for the component template files associated with the component category comprises
selecting, in the project template file, a project type folder corresponding to a specific type of BIOS project,
presenting a user interface in response to selecting, the project type folder;
searching, in the project type folder, for a component category folder associated with a component category,
selecting a component category folder from a first drop-down menu in the user interface;
searching, in the selected component category folder, for component template folders associated with the selected component category,
populating a second drop-down menu with the component template folders;
requesting, a selection, of a component template folder from the second drop-down menu,
receiving the selection of the component template folder as a selected component template folder,
searching, in the selected component template folder, for component template file
requesting a selection of a component template file from the at least one component template file from the selected component template folder as a selected component template file,
receiving the selected component template file;
copying the selected component template file to a directory, the selected component template file comprising instructions for building the BIOS component and a token for activating or deactivating functionality associated with the BIOS component; and
creating a component file comprising a reference to the selected component template file in the directory.

6. The method of claim 5, wherein the selected component template file is a component information (CIF) file.

7. The method of claim 5, further comprising storing the component file within a BIOS project file.

8. The method of claim 5, wherein the instructions comprise a proprietary file containing instructions on how to build components, wherein the selected component template file is a component information file, and wherein the project template file comprises a cabinet (CAB) file.

9. The method of claim 5, further comprising encrypting the project template file to provide for future support of the project template file.

10. The method of claim 5, wherein the physical aspect comprises a central processing unit, a chipset, a flash memory, or an input/output component.

11. The method of claim 5, wherein the logical aspect comprises a core module that is generic from one BIOS project to a second BIOS project, or, a module related to a particular function.

12. A method of creating a BIOS component of a BIOS project, comprising:
providing at least one project type folder;
presenting a user interface in response to receiving, a selected project type folder;
providing, from the selected project type folder, at least one component category corresponding to the BIOS project via the user interface, the at least one component category categorized according to a physical aspect of the BIOS component, a logical aspect of the BIOS component, or a functional aspect of the BIOS component, wherein the BIOS project is a BIOS implementation tailored to a particular motherboard, hardware, and/or software within a computer system;
receiving, from a first drop-down menu in the user interface, a selected component category that corresponds to any of one or more component category folders associated with the BIOS project within a project template file, wherein the project template file comprises a resource-only dynamic link library file that contains a file structure encoded within an encrypted cabinet file;
searching, in the selected component category, for component templates associated with the selected component category,
populating a second drop-down menu with the component templates;
receiving, from the second drop-down menu, a selected component template;
providing, from the selected component template, at least one component template file corresponding to the selection of the component template via the user interface, wherein the at least one component template file comprises an initial file that constitutes the BIOS component and templates of at least one required file for the BIOS component;
receiving a selected component template file;
copying the selected component template file to a directory, the selected component template file comprising instructions for building the BIOS component and a token for activating or deactivating functionality associated with the BIOS component;
creating a component file comprising a reference to the selected component template file in the directory; and
searching the at least one component template file for a macro definition and (1) substituting the macro definition with one or more predefined values or (2) prompting the user for one or more values for the macro definition.

13. The method of claim 12, wherein the at least one component template provided via the user interface corresponds to any component template folders within a component category folder associated with the selected component category; and wherein the at least one component template file provided via the user interface corresponds to any component template files stored within a component template folder associated with the selected component template.

14. The method of claim 12, further comprising:

providing a selectable option via the user interface for adding a component part to the component;

receiving a request via the user interface to add the component part to the component, wherein the component file defines a relationship between the component and the component part.

15. The method of claim 12, wherein the instructions comprise a proprietary file containing instructions on how to build components, wherein the selected component template file is a component information file, and wherein the project template file comprises a cabinet (CAB) file.

\* \* \* \* \*